UNITED STATES PATENT OFFICE.

HARRY S. MORK, OF BOSTON, MASSACHUSETTS, ASSIGNOR TO CHEMICAL PRODUCTS COMPANY, OF BOSTON, MASSACHUSETTS, A CORPORATION OF MAINE.

CELLULOSE ESTER.

1,039,782.  Specification of Letters Patent.  Patented Oct. 1, 1912.

No Drawing.  Application filed March 17, 1910. Serial No. 549,935.

*To all whom it may concern:*

Be it known that I, HARRY S. MORK, of Boston, in the county of Suffolk and State of Massachusetts, have invented an Improvement in Cellulose Esters, of which the following is a specification.

This invention relates to improvements in cellulose esters of the fatty acids, as cellulose acetate, and particularly to the dissolving or gelatinizing of these esters by new solvents, whereby commercially useful films, filaments, and the like may be prepared.

In the manufacture of films, filaments and the like from cellulose esters, and particularly cellulose acetate, it is desirable to use as a solvent, or as one component of a solvent mixture, a neutral liquid having a boiling point somewhat higher than that of water, so that the evaporation of the solvent shall not be too rapid, and so that moisture may be expelled during the formation of the film or sheet. Furthermore, for the production of filaments or artificial silk or horsehair from solutions of cellulose acetate, by injecting such a solution into a coagulating liquid, the use of a solvent with a boiling point greater than that of water is sometimes desirable, for it will permit the use of a coagulating liquid of relatively lower boiling point to be used, a number of which liquids are commercially available. The solvent of a boiling point greater than that of water can easily be recovered from the coagulating bath by a simple fractional distillation.

I have discovered that the methyl ester of chloracetic acid, a neutral liquid boiling at about 129° centigrade, is a very excellent solvent of cellulose acetate, and from solutions of cellulose acetate in methyl chloracetate can be prepared commercially useful films, filaments and the like. As, for example, by dissolving one pound of cellulose acetate in one gallon of methyl chloracetate, at normal temperature, a solution is obtained which flows easily, films nicely, and leaves, upon evaporation, in thin layers, smooth, transparent films or sheets.

It is not necessary to use methyl chloracetate as a solvent by itself, as for many purposes it may be advantageous to mix it with other solvents, or to add to it, or to the solution of cellulose acetate in methyl chloracetate, with or without other solvents, an alcohol which will increase the dissolving power of the solution although alone not a solvent for the cellulose acetate; or even to add to the solution of cellulose acetate in methyl chloracetate liquids which are in no sense solvents of cellulose acetate.

If it is desired that a solution of cellulose acetate be prepared that will evaporate quicker than the solution of cellulose acetate in methyl chloracetate alone, a more rapidly evaporating solvent, such as acetone or chloroform, may be added to methyl chloracetate to produce a mixed solvent, the amount added depending upon the increased rate of evaporation desired. Or, for example, in case it should be desired to increase the rate of coagulation of a solution of cellulose acetate in methyl chloracetate, when injected into a coagulating bath consisting, say, of an alcohol, it would be of advantage to add to the solution a limited amount of a monohydric alcohol of the paraffin series of a boiling point below 80° C., which alone is a non-solvent of the cellulose acetate but which has the effect of adding to the dissolving power of the solution.

If it is desired to produce a dilute solution of cellulose acetate in methyl chloracetate, a limited amount of a non-solvent, such as benzol or carbon-tetrachlorid, may be added to a more concentrated solution of cellulose acetate in methyl chloracetate than the final solution desired.

When using the other solvents, as acetone, or chloroform, or when using the alcohols or absolute non-solvents with or without the other solvents, it is not necessary that the ingredients be mixed in any particular order.

I claim:

1. A composition of matter consisting of cellulose acetate, dissolved in methyl chloracetate.

2. A composition of matter consisting of cellulose acetate, dissolved in methyl chloracetate and another solvent.

3. A composition of matter consisting of cellulose acetate, dissolved in methyl chloracetate and a monohydric alcohol of the paraffin series boiling below 80° C.

4. A composition of matter consisting of cellulose acetate, dissolved in methyl chloracetate and another solvent and a monohydric alcohol of the paraffin series boiling below 80° C.

5. A solvent for cellulose acetate, consisting of methyl chloracetate and another solvent.

6. A solvent for cellulose acetate, consisting of methyl chloracetate and a monohydric alcohol of the paraffin series boiling below 80° C.

7. A solvent for cellulose acetate, consisting of methyl chloracetate and another solvent and a monohydric alcohol of the paraffin series boiling below 80° C.

In testimony whereof, I have signed my name to this specification, in the presence of two subscribing witnesses.

HARRY S. MORK.

Witnesses:
B. J. NOYES,
H. B. DAVIS.